(12) United States Patent
Andrews et al.

(10) Patent No.: US 9,797,703 B2
(45) Date of Patent: Oct. 24, 2017

(54) NON-INVASIVE THICKNESS MEASUREMENT USING RESONANT FREQUENCY SHIFT

(71) Applicant: Duke University, Durham, NC (US)

(72) Inventors: Joseph Batton Andrews, Durham, NC (US); Martin Anthony Brooke, Hillsborough, NC (US); Aaron D. Franklin, Cary, NC (US)

(73) Assignee: DUKE UNIVERSITY, Durham, NC (US)

( * ) Notice: Subject to any disclaimer, the term of this patent is extended or adjusted under 35 U.S.C. 154(b) by 4 days.

(21) Appl. No.: 15/062,377

(22) Filed: Mar. 7, 2016

(65) Prior Publication Data

US 2017/0254634 A1    Sep. 7, 2017

(51) Int. Cl.
*G01B 7/06* (2006.01)
*B60C 19/00* (2006.01)

(52) U.S. Cl.
CPC .............. *G01B 7/06* (2013.01); *B60C 19/00* (2013.01)

(58) Field of Classification Search
CPC ...... G01B 15/02; G01B 17/06; G01M 17/027
See application file for complete search history.

(56) References Cited

U.S. PATENT DOCUMENTS

| | | |
|---|---|---|
| 5,075,979 A | 12/1991 | Foskett |
| 6,496,018 B1 | 12/2002 | Nagata et al. |
| 6,794,886 B1 | 9/2004 | Chen et al. |
| 6,989,675 B2 | 1/2006 | Kesil et al. |
| 7,135,869 B2 | 11/2006 | Sergoyan et al. |
| 2005/0156606 A1 | 7/2005 | Sergoyan et al. |
| 2008/0013070 A1 | 1/2008 | Kawate |
| 2008/0168833 A1 | 7/2008 | Awad |
| 2016/0298957 A1 | 10/2016 | Little, Jr. |

FOREIGN PATENT DOCUMENTS

| | | |
|---|---|---|
| CN | 2172857 Y | 7/1994 |
| CN | 203824513 U | 9/2014 |
| TW | 201205058 A | 2/2012 |
| TW | 201518681 A | 5/2015 |

OTHER PUBLICATIONS

TW Search Report dated Feb. 14, 2017 in re TW Patent Application No. 105117257 filed Jun. 1, 2016.

*Primary Examiner* — Clayton E Laballe
*Assistant Examiner* — Noam Reisner
(74) *Attorney, Agent, or Firm* — Coats & Bennett, PLLC (57) ABSTRACT

A method of measuring thickness of a material generally includes transmitting an oscillating signal from a first pad, through the material, to a second pad, and measuring the signal reflected back to the first pad. The material may be homogenous or heterogeneous, and has dielectric properties. The signal has its frequency varied over time so that the frequency response of the system (the first pad, the material, and the second pad) may be analyzed. The resonant frequency of the system is determined. The thickness of the material is determined based on the resonant frequency shift caused by a change in thickness of the material. The present invention may be advantageously employed to measure the thickness of a vehicle tire or other material. Related apparatuses are also disclosed.

27 Claims, 8 Drawing Sheets

NON-INVASIVE THICKNESS MEASUREMENT USING RESONANT FREQUENCY SHIFT

BACKGROUND

The present invention relates to thickness measurements, and particularly to non-invasive thickness measurements using electromagnetic waves, which in some embodiments may have particular applicability to measuring thickness of a vehicle tire.

Measuring the thickness of a material can be accomplished in a variety of ways. For example, a material sample may be cut from the material and then physically or optically measured. Alternatively, the material may be punctured by a suitable device, and the thickness measured thereby. However, for some materials, it may be undesirable to damage the material in order to measure the thickness of the material. Accordingly, some physically non-invasive thickness measurement techniques have been developed. For example, U.S. Pat. No. 7,135,869 describes an approach that utilizes a cavity resonator that is closed off by being placed against a coated metallic surface, with the thickness of the coating being determined based on the resulting resonate frequency of the cavity resonator. However, such an approach requires the presence of a metallic substrate, a homogenous coating layer, physical access to the exposed surface of the coating, and that the cavity resonator be placed physically against the coating, some or all of which may be inappropriate for other situations than for testing coating thickness on an aircraft wing.

Thus, while the prior art approaches to thickness measurements may be suitable for some situations, they may not be ideal for all situations. Accordingly, there remains a need for alternative approaches to measuring a thickness of a material, particularly methods that are physically non-invasive, and to corresponding apparatuses.

SUMMARY

Described below are one or more embodiments of methods of measuring thickness of a material, and/or to related apparatuses. The method generally includes transmitting an oscillating signal from a first pad, through the material, to a second pad, and measuring the signal reflected back to the first pad. The material may be homogenous or heterogeneous, and has dielectric properties. The signal has its frequency varied over time so that the frequency response of the system (the first pad, the material, and the second pad) may be analyzed. Ideally, the resonant frequency of the system is determined. Because the material acts as a dielectric, the resonant frequency of the system changes as the thickness of the material changes. Thus, the thickness of the material may be determined based on the resonant frequency shift caused by a change in thickness of the material. The present invention may be advantageously employed to measure the thickness of a vehicle tire, but the invention is not limited in all embodiments to vehicle tire applications.

In one or more embodiments, the present invention provides a method of determining a thickness of a material. The method comprises: a) transmitting an oscillating signal from a first pad; wherein the signal is transmitted at a frequency that is varied over time so that the signal is transmitted at a plurality of frequencies in corresponding time intervals; b) passing the signal through the material, wherein the material is a heterogeneous material (i.e., a composite material comprising at least two different substances that are distinct from each other); c) reflecting the signal at a second pad after the signal has passed through the material, the second pad disposed in spaced relation to the first pad and electrically isolated therefrom; d) receiving the reflected signal at the first pad; e) determining a resonate frequency of a system based on the received signal; the system comprising the first pad, the second pad, and the material; and f) determining the thickness of the material based on the resonate frequency. The first pad and the second pad may be disposed proximate to each other on the same side relative to the material, and may advantageously be disposed substantially parallel to each other. The first pad and the second pad may be both disposed in spaced relation to the material, or in direct contact with the material, or any combination thereof. The plurality of frequencies may advantageously be all sub-microwave frequencies. The transmitting may comprise sweeping a frequency band with the signal, or not, as is desired. The material may comprise metal embedded in a dielectric material, such as a portion of a vehicle tire. The metal may comprise a steel reinforcing mesh for the vehicle tire. The material may have a plurality of recesses on a surface thereof disposed opposite the first and second pads.

In some embodiments, the present invention provides a method of determining a thickness of a material between first and second generally oppositely disposed surfaces. The method comprises: a) transmitting an oscillating signal from a first pad; wherein the signal is transmitted at a frequency that is varied over time so that the signal is transmitted at a plurality of frequencies in corresponding time intervals; b) passing the signal through the material, wherein the second surface of the material comprises a plurality of recesses therein; c) reflecting the signal at a second pad after the signal has passed through the material, the second pad disposed in spaced relation to the first pad and electrically isolated therefrom; d) receiving the reflected signal at the first pad; e) determining a resonate frequency of a system based on the received signal; the system comprising the first pad, the second pad, and the material; and f) determining the thickness of the material based on the resonate frequency. The first pad and the second pad may be disposed proximate to each other on the same side relative to the material, and may advantageously be disposed substantially parallel to each other. The first pad and the second pad may be both disposed in spaced relation to the material, or in direct contact with the material, or any combination thereof. The plurality of frequencies may advantageously be all sub-microwave frequencies. The transmitting may comprise sweeping a frequency band with the signal, or not, as is desired. The material may comprise metal embedded in a dielectric material, such as a portion of a vehicle tire. The metal may comprise a steel reinforcing mesh for the vehicle tire. The material may have a plurality of recesses on a surface thereof disposed opposite the first and second pads.

In some embodiments, the present invention provides a tire assembly comprising a tire, a first electrically conductive pad, a second electrically conductive pad, and a processing circuit. The tire comprises a dielectric material and a metal material embedded therein. The tire has an inner surface and an exterior surface disposed generally opposite to the inner surface. The first pad is configured to transmit an oscillating signal at a plurality of frequencies during corresponding time intervals. The second pad is configured to reflect the signal after the signal has passed through the tire. The second pad disposed in spaced relation to the first pad and electrically isolated therefrom. The first pad is further configured to receive the reflected signal. The processing circuit communicatively connected to the first pad and configured to: a) determine a resonate frequency of a system based on the received signal; the system comprising the first pad, the second pad, and the tire; and b) determining a local thickness of the tire based on the resonate frequency. The exterior surface of the tire may comprise a plurality of recesses. The first and second pads may be disposed closer to the inner surface than the exterior surface of the tire. The first and second pads may be disposed substantially parallel to each other. The first pad may be disposed in spaced relation to the tire. The processing circuit may be configured to determine the local thickness based on the resonate frequency by consulting a lookup table of reference values. The processing circuit may be mounted to the tire. In some embodiments, the first pad and the second pad comprise a first sensor assembly, and the tire assembly further comprises at least a second sensor assembly disposed in spaced relation to the first sensor assembly; the second sensor assembly configured to determining a local thickness of the tire at a location spaced from the first sensor assembly.

The various aspects of the devices and methods discussed herein may be used alone or in any combination. Further, the present invention is not limited to the above features and advantages. Indeed, those skilled in the art will recognize additional features and advantages upon reading the following detailed description, and upon viewing the accompanying drawings.

DETAILED DESCRIPTION

In one or more embodiments, the present application is directed to methods of measuring thickness of a material, and/or to related apparatuses. The method generally includes transmitting an oscillating signal from a first pad, through the material, to a second pad, and measuring the signal reflected back to the first pad. The material may be homogenous or heterogeneous, and has dielectric properties. The signal has its frequency varied over time so that the frequency response of the system (the first pad, the material, and the second pad) may be analyzed. Ideally, the resonant frequency of the system is determined. Because the material acts as a dielectric, the capacitance of the system, and thus its resonant frequency, changes as the thickness of the material changes. Thus, the thickness of the material may be determined based on the resonant frequency shift caused by a change in thickness of the material. The present invention may be advantageously employed to measure the thickness of a vehicle tire, but the invention is not limited in all embodiments to vehicle tire applications.

Figure 1:
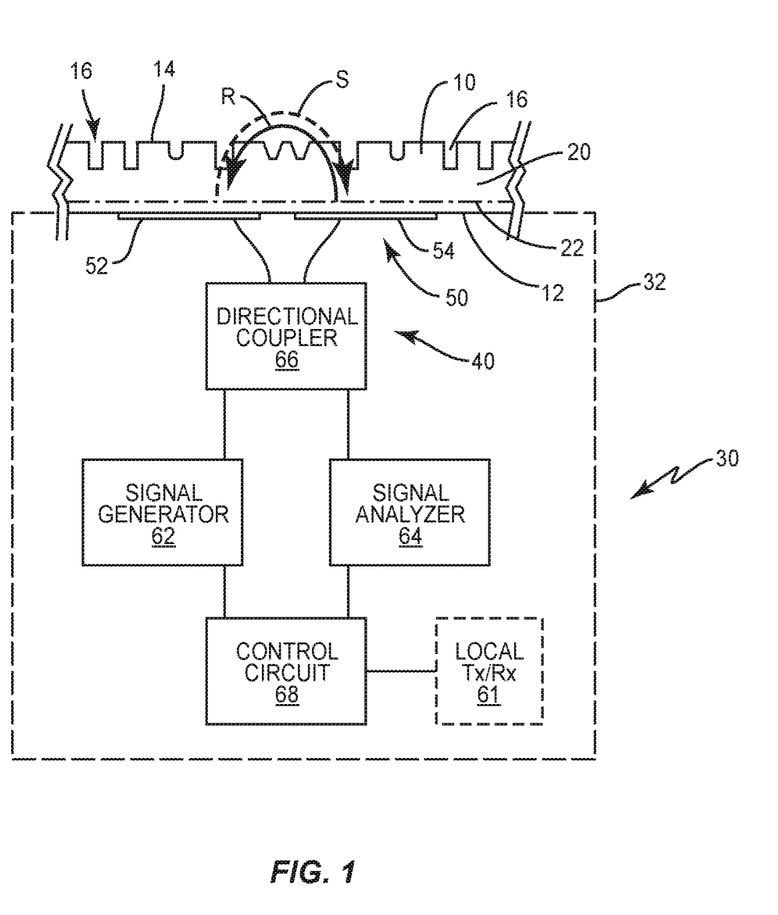
FIG. 1 shows a portion of a tire with a thickness measurement device according to one embodiment, with a material having a plurality of recesses therein.

In one exemplary embodiment, shown in FIG. 1, a measurement circuit (generally indicated at 40) forms a portion of a measurement device 30. The simplified measurement circuit 40 of FIG. 1 includes a sensor assembly 50, a signal generator 62, a signal analyzer 64, a directional coupler 66, and a control circuit 68. Merely as an example, FIG. 1 shows the measurement circuit 40 as being housed in a housing 32 so as to make a portable measurement device 30. However, it should be noted that the measurement circuit 40 does not need to be contained in a portable housing 32. Indeed, some or all of the portions of the measurement circuit 40, in various embodiments may be affixed to the material 10, and/or otherwise not disposed in a single housing 32. Thus, the housing 32 in FIG. 1 is shown in dashed lines to indicate that it is optional.

The sensor assembly 50 is positioned near a material 10 to facilitate measurement of the material's thickness. The sensor assembly 50 includes a first pad 52 and a second pad 54 that are disposed proximate to, but spaced from, each other. The first and second pads 52, 54 are electrically conductive and electrically isolated from each other. In this embodiment, the first pad 52 and the second pad 54 are both generally planar, and disposed on the same side of the material 10, disposed physically parallel to each other, and disposed in the same plane, but none of these features are required. Thus, the pads 53, 54 may alternatively be disposed on opposite sides of the material 10, and/or be disposed in non-parallel orientations, and/or disposed in different planes, and/or may not be planar (e.g., significantly curved, although being substantially planar is believed to be advantageous). For the embodiment of FIG. 1, the first pad 52 is connected to the signal generator 62 and the signal analyzer 64 (both via the directional coupler 66), and may therefore be referred to as the signal pad 52. For the embodiment of FIG. 1, the second pad 54 is grounded, and acts to reflect the signal transmitted by the signal pad 52, and may therefore be referred to as the reflection pad.

Figure 2:
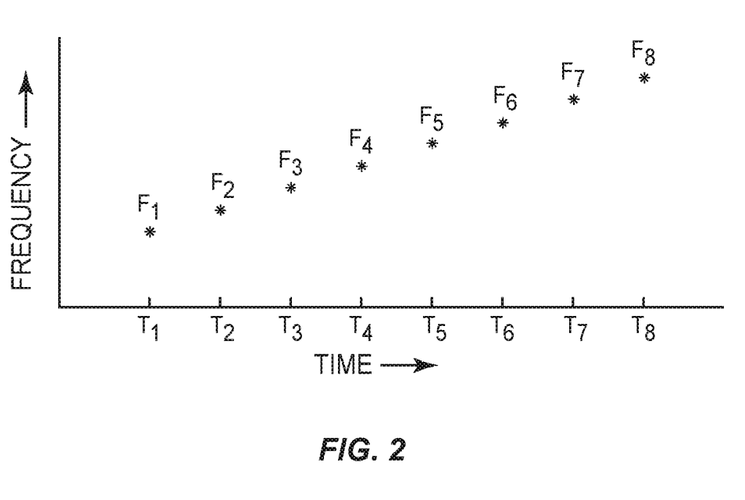
FIG. 2 shows one possible relationship between transmit frequency and corresponding time intervals.

The signal generator 62 generates an oscillating signal (AC signal) at a frequency. The frequency of the signal is varied over time, so that the signal may have a different frequency in different measurement time intervals. For example, FIG. 2 shows one possible relationship between the frequency of the signal (F1, F2, . . . ) and the corresponding time interval (T1, T2, . . . ). The variation of frequency may be done by sweeping a measurement frequency band in a continuous fashion, sweeping in a stepwise fashion, by randomly varying the frequency within the measurement frequency band, or in any other suitable fashion. The frequencies of the signal are advantageously all sub-microwave frequencies, such as in the range of 75-150 Mhz. In some embodiments, the signal generator 62 may take the form of a voltage controlled oscillator.

The signal generator 62 is connected to the signal pad 52 via the directional coupler 66. The directional coupler 66 also connects the signal pad 52 to the signal analyzer 64. The directional coupler 66 acts in a conventional fashion to separate the transmit signal from the receive signal such that the transmit signal from the signal generator 62 is routed to the signal pad 52, and the received signal is routed to the signal analyzer 64. The received signal may advantageously also be amplified. It should be noted that the directional coupler 66 may not be required in all embodiments, and alternative embodiments may use other signal cancellation arrangements if desired.

The signal analyzer 64 acts, in a conventional fashion, to covert the received signal R to a form suitable for input to the control circuit 68, so as to provide information about one or more parameters of the received signal. For example, the signal analyzer 64 may be configured to vary its output voltage based on the signal strength of the receive signal.

Figure 3:
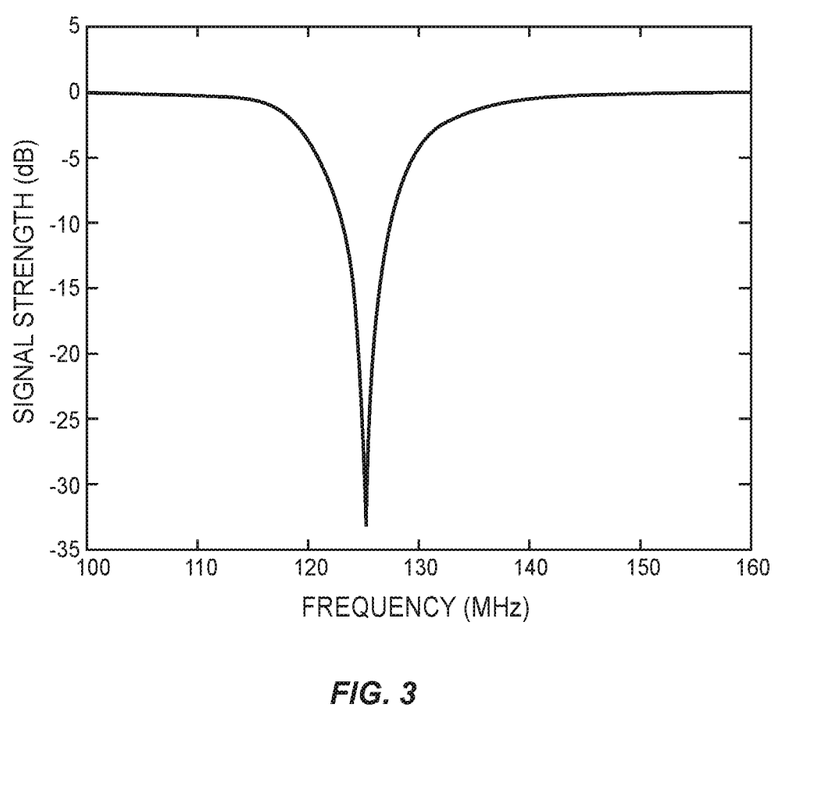
FIG. 3 shows a graph of signal strength vs. frequency for a received signal.
Figure 4:
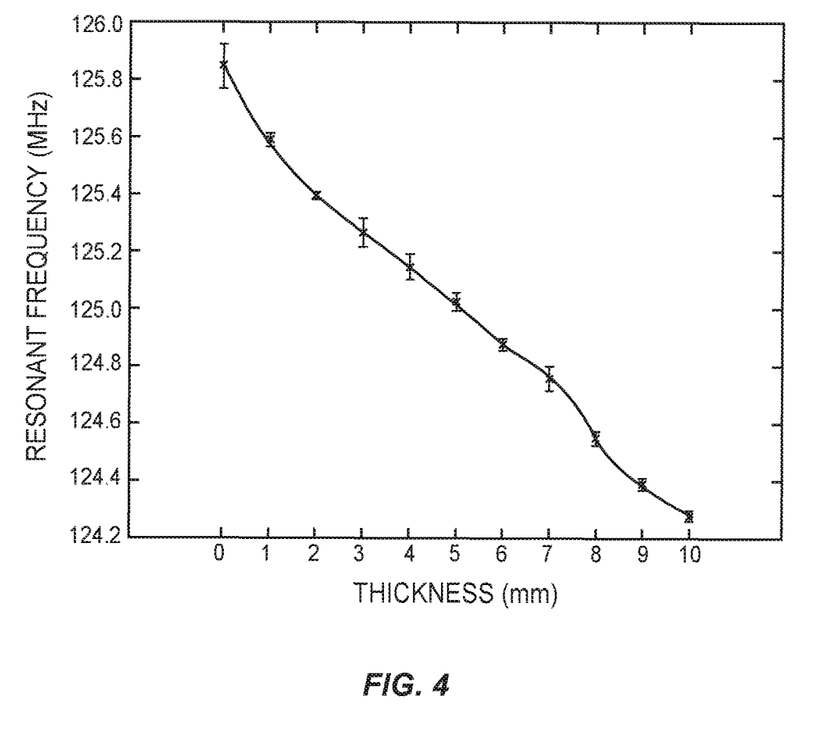
FIG. 4 shows a graph of resonant frequency vs. material thickness.

The control circuit 68 tracks the signal strength at the of the received signal over time. In addition the control circuit 68 controls the signal generator 62, such that the control circuit 68 is aware of the frequency of the signal S being transmitted by the signal pad 52. Accordingly, the control circuit 68 is able to track the attenuation vs. frequency response of the system formed by the signal pad 52, the material 10, and the reflection pad 54. Based on the monitored attenuation vs. frequency response, the control circuit 68 is able to determine a resonant frequency of the system, with the resonant frequency being the frequency at which the attenuation of the received signal is greatest (a local minima for the signal strength of the received signal) within the measurement frequency band. By way of example, FIG. 3 shows a plot of received signal strength vs. frequency, showing that a clear resonant frequency at about 125 mHz. The resonant frequency may be determined from the signal strength measurements at different frequencies using any suitable computational techniques, such as continuous wavelet transforms. For example, the control circuit may compare the power of the received signal at the various transmit frequencies, and identify as the resonant frequency the frequency at which a minimum power of the received signal is noted, either by simply identifying the corresponding frequency, or by employing suitable interpolation if further frequency granularity is needed. Then, based on the determined resonant frequency, the control circuit 68 is able to determine the thickness and/or thickness change of the material. To do so, the control circuit 68 may compare the measured resonant frequency to pre-stored reference information about resonant frequency vs. thickness. For example, the control circuit 68 may access an internal and/or external look-up table of empirically measured resonant frequencies and corresponding thicknesses. Such a lookup table may represent the relationship of resonant frequency vs. material thickness, such as that shown in FIG. 4. As can be appreciated, the curve of this plot may be used to determine thickness from the determined resonant frequency using any suitable computational technique. The control circuit 68 may take any suitable form, such a suitably programmed general purpose processor, an ASIC, discrete hardware components, or any combination thereof.

It should be noted that the control circuit 68 is advantageously configured to communicate the determined material thickness to other device(s) (e.g., a vehicles central control system), such by being operatively connected to a suitable short range (e.g., BLUETOOTH, ZIGBEE, Radio Frequency Identification (RFID), etc.) transmitter/receiver 61 or by other suitable communications techniques.

It should be further noted that the various components of the measurement circuit 40 are powered by one or more power sources (not shown), such a batteries and/or capacitors, which may be centrally located or distributed as is desired, and/or energy obtained from radio frequency (RF) signals received by portions of the measurement circuit 40.

For all the measurement circuit embodiments, as discussed above, the material 10 may be homogenous or heterogeneous, and has dielectric properties. Thus, the material 10 may be homogeneous, and may optionally have an exterior surface 14 that comprises a plurality of recesses 16 therein, such as the recesses 16 that define treads of a tire. As such, the thickness of the material 10 in the area being measured may not be a single uniform thickness, but may be a composite value, such as an average thickness. The material 10 may alternatively be heterogeneous, such a conventional "steel belted" radial tire 10 that has a steel reinforcing mesh or "belt" 22 entirely or partially embedded in a natural or synthetic "rubber" matrix 20. One or more of the components of the heterogeneous material may be electrically conductive metallic material (e.g., the steel belts 22), while at least one other of the components is dielectric (e.g., the rubber 20).

Figure 5:
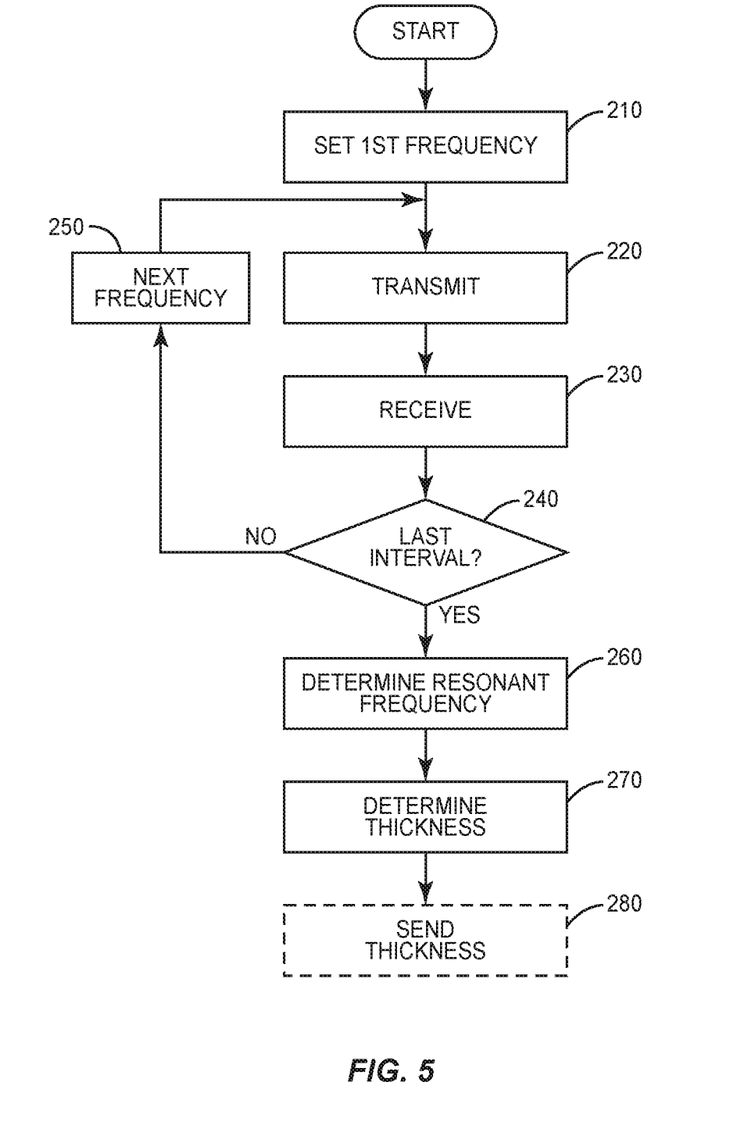
FIG. 5 shows simplified process flow chart for one or more embodiments.

With reference to FIG. 5, a method of measuring the thickness may start by setting a first frequency of the signal S to be transmitted by the signal pad 52 (step 210). This setting of the first frequency may be via the control circuit 68 sending appropriate instructions/inputs to the signal generator 62. Signal S is then transmitted by the signal pad 52 (step 220), and reflected by the reflection pad 54 after passing through the material (step 230), and then passes through the material again to be received as the reflected signal R at the signal pad 52. Note that while steps 220 and 230 are shown as sequential in FIG. 5, these steps are actually simultaneous (ignoring negligible propagation delay). At step 240, it is checked whether the current time interval is the last interval (or alternatively whether the current transmit frequency is the last frequency). If not, the process continues by adjusting the frequency of the signal supplied to the signal pad 52 to be the next frequency (step 250), and returns to step 220. If the time interval/frequency is the last, then the process continues to step 260, where the resonant frequency is determined. Next, the thickness of the material is determined based on the determined resonant frequency (step 270). The process may then proceed to optional step 280 where the determined thickness is supplied to other electronics for subsequent processing and/or displayed, as is appropriate.

Figure 6:
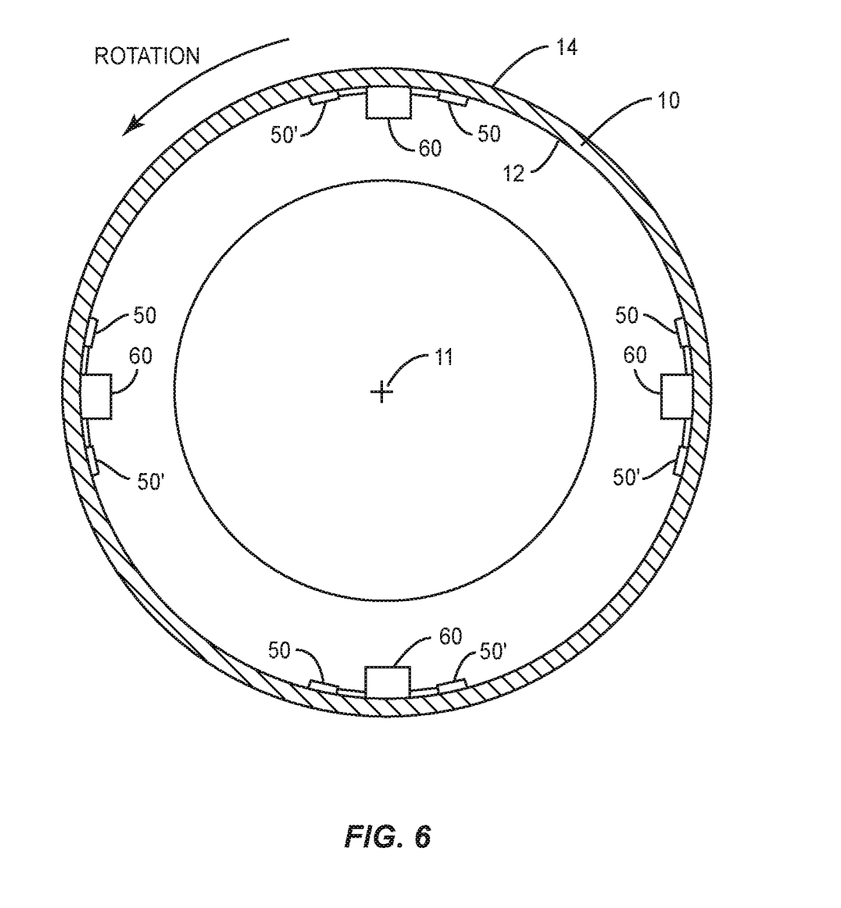
FIG. 6 shows a cross-section of a tire with multiple measurement circuits mounted to an inside surface thereof
Figure 7:
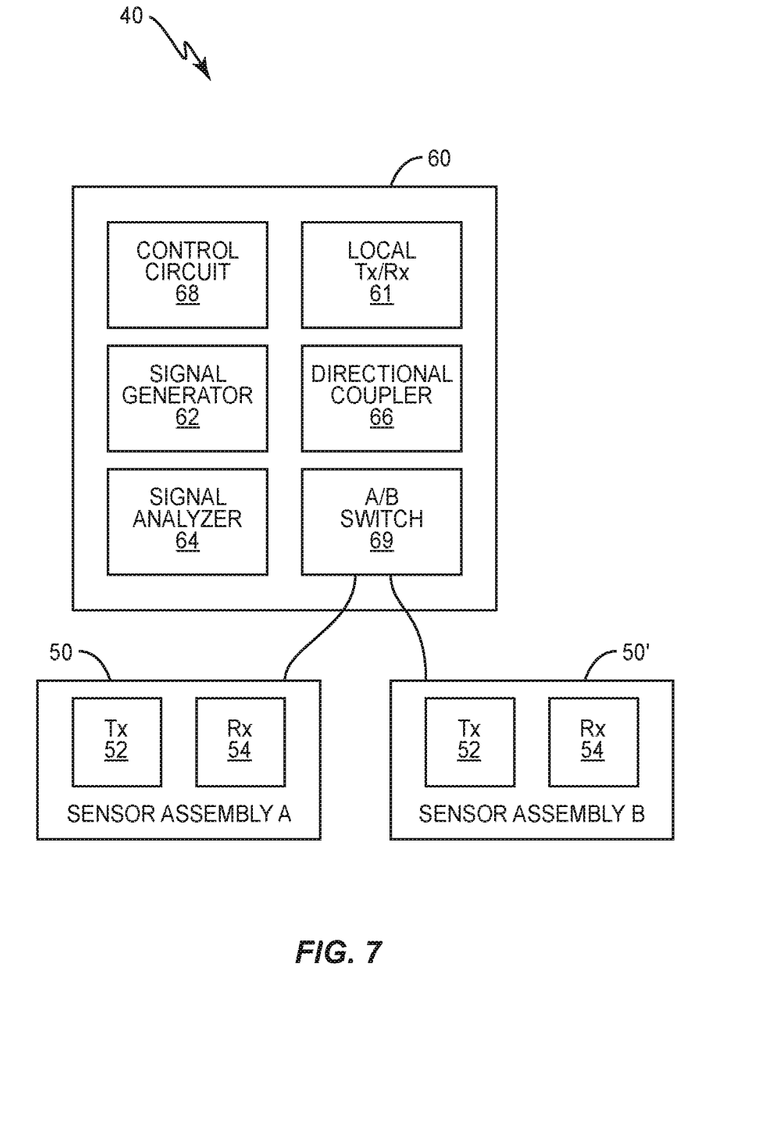
FIG. 7 shows a dual sensor assembly measurement circuit of the type shown in FIG. 6.

Using a mounted vehicle tire (tire 10 mounted on a wheel) as an exemplary environment, the measurement circuit 40 may be mounted to the inner surface 12 of the tire 10, with the signal pad 52 and reflection pad 54 abutting the inner surface 12 of the tire 10. If only a single measurement circuit 40 is to be employed, suitable counterweight(s) (not shown) are advantageously added to the associated wheel and/or tire 10 to offset the mass of the measurement circuit 40 so as to maintain rotational balance. While only a single measurement circuit 40 may be used, it is believed advantageous if multiple measurement circuits 40 are employed, with the corresponding sensor assemblies 50 distributed to suitable spaced apart locations around the tire 10. In some embodiments, each sensor assembly 50 may have a corresponding dedicated control circuit 68; in other embodiments, the sensor assemblies 50 may share one or more control circuits 68, and/or signal generators 62, and/or signal analyzers 64, and may be time multiplexed. For example, as shown in FIGS. 6-7, one approach is to utilize a common main circuit 60 connected to a plurality of sensor assemblies 50, 50', advantageously with a plurality of such multi-sensor assembly measurement circuits disposed around the tire 10 in spaced relation to each other. The main circuit 60 includes the control circuit 68, the signal generator 62, the signal analyzer 64, the directional coupler 66, the local transmitter/receiver 61, and an A/B switch 59. Sensor assembly 50 and sensor assembly 50' connect to the main circuit 60 via the A/B switch 69, each with their own signal and reflection pads 52, 54. The A/B switch 69 may be used to switch between the sensor assemblies 50, 50' so that the same main circuit 60 may be used to determine the thickness at two different locations without being moved. Of course, A/B switch 69 may instead be a suitable multiplexer/demultiplexer, as is desired. Further, this approach to multi-sensor assembly measurement circuits may be expanded so that a single main circuit 60 is connected to and uses three, four, or more sensor assemblies 50, rather than just two sensor assemblies 50, 50' illustrated in FIGS. 6-7.

Continuing with the mounted vehicle tire 10 as an exemplary environment, in some embodiments, portions of the measurement circuit 40 may be disposed outside the tire 10, rather than the entirety of the measurement circuit 40 being disposed inside the tire 10. In one such example, the sensor assembly 50 may be mounted to the interior surface of the tire 10, and a suitable short range transmitter/receiver device pair (e.g., a BLUETOOTH transmitter/receiver pair, a ZIGBEE transmitter/receiver pair, an RFID transmitter/receiver pair, etc.) (not shown) interposed between the control circuit 68 and the balance of the measurement circuit 40, so that the control circuit 68 is mounted in a fixed location (e.g., on the corresponding vehicle wheel well), and communicates via the intervening wireless link with the sensor assembly 50 and other portions of the measurement circuit 40.

Figure 8:
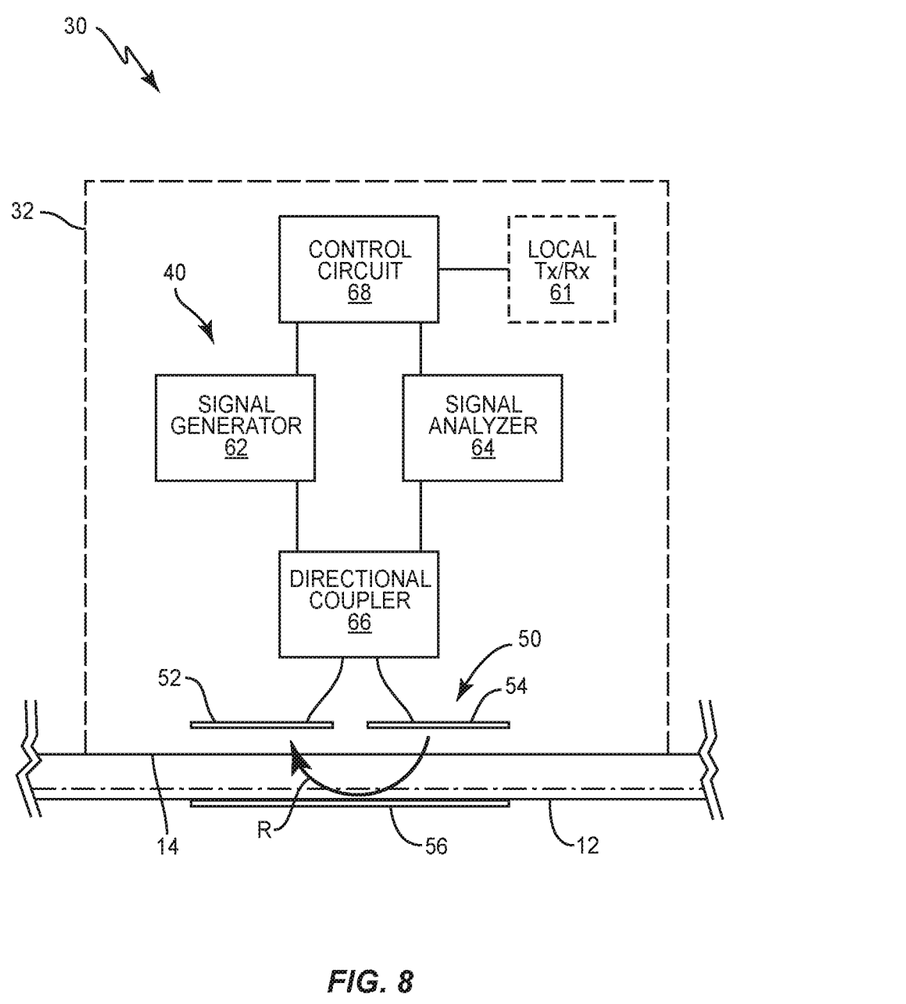
FIG. 8 shows a thickness measurement device according to another embodiment, where the signal pad and a reflection pad are spaced from the material, and where the material has a smooth outer surface.

Alternatively, as shown in FIG. 8, the sensor assembly 50 may additionally include a third pad 56 that is mounted to the interior surface 12 of the tire 10, and is disposed so as to overlap the signal pad 52 and the reflection pad 54. The signal S, in such an arrangement, is transmitted by the signal pad 52, passes through the material 10, is conceptually reflected by the third pad 56, passes back through the material 10, and is reflected by the reflection pad 54, and reverses path back to the signal pad 52. For such an arrangement, the active components of the measurement circuit 40 are disposed outside of the tire 10, and therefore may be disposed in an angularly fixed location relative to the axis of rotation of the tire 10. Alternatively, the active components may be placed in a handheld housing 32 that is placed against the outside surface 14 of the tire 10, opposite the third pad 56, so as to measure the thickness of the tire 10. Thus, the measurement device 30 may include the housing 32 having the control circuit 68, signal generator 62, signal analyzer 64, directional coupler 66, and the signal and reflection pads 52, 54; while the third pad 56 may be attached to an opposing surface of the material 10 (e.g., the inner surface 12 of tire 10). In such an arrangement, it is not required, but may be advantageous, for the signal and reflection pads 52, 54 to be spaced from the material 10 by the housing 32, when the housing 32 is abutting the material 10. This is one example of an embodiment where the signal and reflection pads 52, 54 are spaced from the material 10 while determining the material's thickness. And, as can be appreciated, there may be multiple third pads 56 located as suitable locations on the material 10, so that thickness measurements may be taken as several locations.

As mentioned above, in some embodiments, the measurement circuit 40 may be fully contained in a suitable housing 32 to make a self-contained portable measurement device 30. Alternatively, portions of the measurement circuit 40 may be contained in a housing 32, with other portions disposed outside the housing 32, on or near the material 10. In other embodiments, portions of the measurement circuit 40 may be disposed in various locations on or near the material 10, and either mounted to the material so 10 as to move therewith, or physically decoupled from the material 10 to allow for one or more degrees of freedom of relative movement, without any housing 32.

The discussion above has generally been in the context of at least one of the signal and reflection pads 52, 54, or the third pad 56, being in contact with a surface of the material 10 whose thickness is to be determined. While such a configuration is believed to be advantageous, it is not required. Indeed, in some embodiments without the third pad 56, both the signal and reflection pads 52, 54 (and the entire measurement circuit 40) are disposed in spaced relation to the material 10. Provided that this spacing of the signal and reflection pads 52, 54 relative to the material surface can be reliably repeated, so as to be able to compare a current reading to previously gathered data, the signal strength from the reflection pad 54 should be a reliable indicator of material thickness. For embodiments with a third pad 56 permanently affixed to the "far" surface of the material 10, the signal and reflection pads 52, 54 may be spaced from the near surface of the material 10 by a suitable standoff that touches the surface of the material, such as a housing 32 of a handheld unit, or some other device (e.g., a jig) that holds the signal and reflection pads 52, 54 a repeatable distance from a reference point associated with the material 10, such as the rotational axis of the tire 10.

While the discussion above has generally been in the context of a tire 10, or at least used a tire 10 as an exemplary material 10, such is not required. The measurement circuit 40 may be used to measure the thickness of a variety of materials, not just tires. For example, the measurement circuit 40, in various embodiments, may be used to measure the thickness of any material that is heterogeneous, with at least one component that is electrically conductive, and at least one component that is dielectric. Similarly, the measurement circuit 40, in various embodiments, may be used to measure the thickness of any material that at least partially dielectric and has an exterior surface that comprises a plurality of recesses therein, such as grooves, channels, areas between projections, and the like.

The measurement circuit 40 may be formed from conventional discrete components. Alternatively, one or more portions of the measurement circuit 40 may be formed a thin film materials, in a fashion similar to an RFID tag. Still further, one or more of the components may be formed by a printing process employing nanoparticles, either directly onto a surface of the material and/or onto a suitable substrate that is adhered to the material's surface, as is desired.

The discussion above has generally been in the context of measuring a reflected signal received at the signal pad, and determining the resonant frequency based on the reflected signal. However, in some embodiments the resonant frequency may be determined based on a received signal that is not reflected per se. Indeed, in some embodiments, the directional coupler 66 may be optionally omitted, with the first pad 52 operatively connected to the signal generator 62 and the second pad 54 operatively connected to the signal analyzer 64, by direct lines or otherwise. The signal analyzer 64 would then operate on the signal received at the second pad 54, which was transmitted by the first pad 52 and attenuated while passing through the material 10 before being received at the second pad 54. The resonant frequency would then be determined based on this received signal, rather than a signal that is reflected by the second pad 54 and received at the first pad 52. As can be appreciated, suitable precautions (e.g., cancellation mixer arrangements) are advantageously taken to eliminate error inducing cross-talk between the transmitted signal and the received signal for such embodiments.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of determining a thickness of a material, the method comprising:
   transmitting an oscillating signal from a first pad; wherein the signal is transmitted at a frequency that is varied over time so that the signal is transmitted at a plurality of frequencies in corresponding time intervals;
   passing the signal through the material, wherein the material is a heterogeneous material;
   reflecting the signal at a second pad after the signal has passed through the material, the second pad disposed in spaced relation to the first pad and electrically isolated therefrom;
   receiving the reflected signal at the first pad;
   determining a resonate frequency of a system based on the received signal; the system comprising the first pad, the second pad, and the material;
   determining the thickness of the material based on the resonate frequency.

2. The method of claim 1, wherein the first pad and the second pad are disposed proximate to each other on a same side relative to the material.

3. The method of claim 2, wherein the first pad and the second pad are disposed substantially parallel to each other.

4. The method of claim 1, wherein the plurality of frequencies are all sub-microwave frequencies.

5. The method of claim 1, wherein the first pad and the second pad are both disposed in spaced relation to the material.

6. The method of claim 1, wherein the transmitting comprises sweeping a frequency band with the signal.

7. The method of claim 1, wherein the material comprises metal embedded in a dielectric material.

8. The method of claim 7, wherein the material comprises a portion of a vehicle tire.

9. The method of claim 8, wherein the metal comprises a steel reinforcing mesh for the vehicle tire.

10. The method of claim 1, wherein the material has a plurality of recesses on a surface thereof disposed opposite the first and second pads.

11. A method of determining a thickness of a material between first and second generally oppositely disposed surfaces, the method comprising:
    transmitting an oscillating signal from a first pad; wherein the signal is transmitted at a frequency that is varied over time so that the signal is transmitted at a plurality of frequencies in corresponding time intervals;
    passing the signal through the material, wherein the second surface of the material comprises a plurality of recesses therein;
    reflecting the signal at a second pad after the signal has passed through the material, the second pad disposed in spaced relation to the first pad and electrically isolated therefrom;
    receiving the reflected signal at the first pad;
    determining a resonate frequency of a system based on the received signal; the system comprising the first pad, the second pad, and the material;
    determining the thickness of the material based on the resonate frequency.

12. The method of claim 11, wherein the first pad and the second pad are disposed proximate to each other on a same side relative to the material.

13. The method of claim 12, wherein the first pad and the second pad are disposed substantially parallel to each other.

14. The method of claim 11, wherein the plurality of frequencies are all sub-microwave frequencies.

15. The method of claim 11, wherein the first pad and the second pad are both disposed in spaced relation to the material.

16. The method of claim 11, wherein the transmitting comprises sweeping a frequency band with the signal.

17. The method of claim 11, wherein the material comprises metal embedded in a dielectric material.

18. The method of claim 17, wherein the material comprises a portion of a vehicle tire.

19. The method of claim 18, wherein the metal comprises a steel reinforcing mesh for the vehicle tire.

20. An tire assembly, comprising:
    a tire comprising a dielectric material and a metal material embedded therein; the tire having an inner surface and an exterior surface disposed generally opposite to the inner surface;
    a first electrically conductive pad configured to transmit an oscillating signal at a plurality of frequencies during corresponding time intervals;
    a second electrically conductive pad configured to reflect the signal after the signal has passed through the tire; the second pad disposed in spaced relation to the first pad and electrically isolated therefrom;
    wherein the first pad is further configured to receive the reflected signal;
    a processing circuit communicatively connected to the first pad and configured to:
       determine a resonate frequency of a system based on the received signal; the system comprising the first pad, the second pad, and the tire;
       determining a local thickness of the tire based on the resonate frequency.

21. The tire assembly of claim 20, wherein the exterior surface of the tire comprises a plurality of recesses.

22. The tire assembly of claim 20, wherein the first and second pads are disposed closer to the inner surface than the exterior surface of the tire.

23. The tire assembly of claim 20, wherein the first and second pads are disposed substantially parallel to each other.

24. The tire assembly of claim 20, wherein the first pad is disposed in spaced relation to the tire.

25. The tire assembly of claim 20, wherein the processing circuit is configured to determine the local thickness based on the resonate frequency by consulting a lookup table of reference values.

26. The tire assembly of claim 20, wherein the processing circuit is mounted to the tire.

27. The tire assembly of claim 20:
    wherein the first pad and the second pad comprise a first sensor assembly;
    further comprising a second sensor assembly disposed in spaced relation to the first sensor assembly; the second sensor assembly configured to determining a local thickness of the tire at a location spaced from the first sensor assembly.

* * * * *